UNITED STATES PATENT OFFICE.

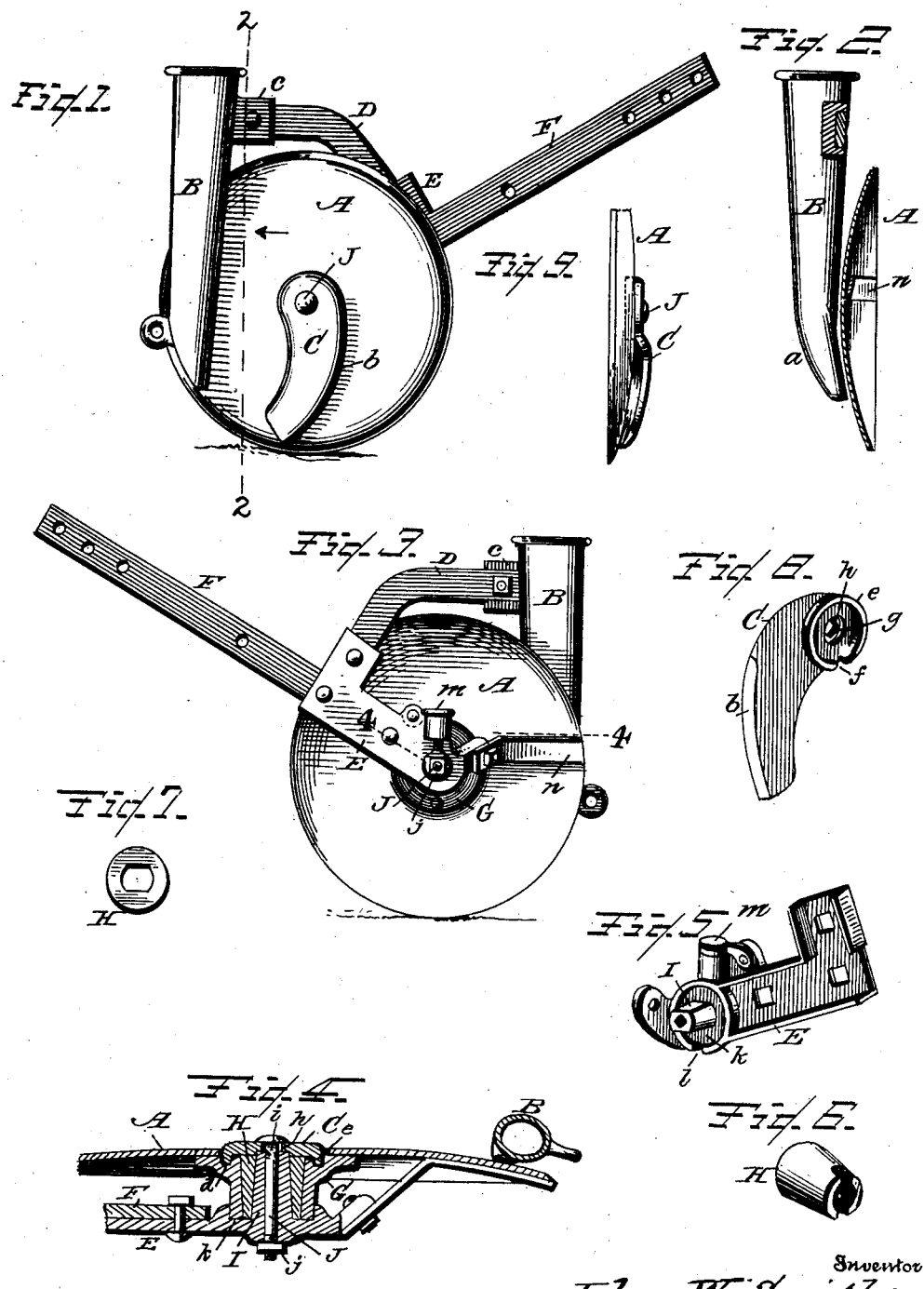

JOHN WILKINSON SMITH, OF LIBERTY, INDIANA, ASSIGNOR TO RUDE BROTHERS MANUFACTURING COMPANY, OF LIBERTY, INDIANA, A CORPORATION OF INDIANA.

DISK-DRILL ATTACHMENT.

No. 826,901.  Specification of Letters Patent.  Patented July 24, 1906.

Application filed June 19, 1905. Serial No. 266,005.

*To all whom it may concern:*

Be it known that I, JOHN WILKINSON SMITH, a citizen of the United States, residing at Liberty, in the county of Union and State of Indiana, have invented certain new and useful Improvements in Disk-Drill Attachments; and I do hereby declare that the following is a full, clear, and exact description of the same, reference being had to the annexed drawings, making a part of this specification, and to the letters of reference marked thereon.

The present invention has reference to that class of disk drills or seeding-machines provided with furrow-opening disks, and the object thereof is to so locate the conduit-tube and the scraper with relation to each other and to the disk that an unobstructed space will be left between the tube and disk for the passage of the earth and trash, and also to provide a simple and practicable means for attaching the scraper whereby the same may be rendered adjustable, as circumstances require, and providing said scraper with a flanged dust-cap.

The invention consists in a disk-drill attachment constructed substantially as shown in the drawings, and hereinafter described and claimed.

Figure 1 of the drawings is a side elevation of a disk-drill attachment embodying my invention; Fig. 2, a vertical section thereof, taken on line 2 2 of Fig. 1, looking in the direction of the arrow and showing the relative position of the disk and conduit-tube; Fig. 3, a side elevation of the attachment, showing the reverse side to that of Fig. 1; Fig. 4, a transverse sectional view taken on line 4 4 of Fig. 3; Fig. 5, a perspective view showing the inner side of the bracket with which the various parts of the attachment are connected; Fig. 6, a perspective view of the bearing-sleeve; Fig. 7, an end view of said sleeve; Fig. 8, perspective view showing the inner side of the scraper; Fig. 9, a detail view of a portion of the disk and the scraper looking in a direction opposite to the arrow shown in Fig. 1.

In the accompanying drawings, A represents a furrow-opening disk of the usual construction, and B the conduit-tube, which conducts the grain to the open furrow and has an inwardly-curved lower end, as shown at $a$ in Fig. 2 of the drawings, whereby its lower end will come in closer proximity to the convex side of the disk to serve as a scraper when desired or found necessary, and C represents the scraper connecting with the axis of the disk.

The location of the conduit-tube and the scraper with relation to each other and to the disk provides a clear and unobstructed space between the tube and scraper for the passage of the earth and trash, there being no intermediate connections between said tube and scraper, thereby leaving a clear and wide space for the dirt, trash, or earth to fall down between without in any manner interfering with the discharge end of the tube.

It will be noticed that the scraper C extends across the lower part of the disk A in advance and free from the conduit-tube, both tube and disk being unconnected with and independent of each other, the convex side of the disk being free from all parts excepting the tube and scraper, thereby removing the possibility of the grass or trash from hooking onto the discharge end of the tube and interfering with the deposit of the grain. It will be further noticed that the point of the scraper is disposed on a plane below and forward of the point of the conduit-tube, leaving a space between them for the dirt to fall through, and any grasses or trash that may engage with the scraper will work off the point thereof and not interfere with the conduit-tube. The forward or scraping edge $b$ of the scraper extends forward of the center of the disk A and is curved to conform to the convex side of the disk, and the deeper the disk runs the scraper will press upon the land side of the furrow, preventing the side pressure of the disk and taking the side strain off of the drag-bar.

The conduit-tube B may be suspended upon the convex side of the disk A by any suitable means found best adapted to the purpose, such as a frame or bearing structure or any other form of structure that will serve the purpose. In the present instance I have shown one of many means that may be employed in providing the conduit-tube B with a flanged lug $c$ near the upper end thereof and a suitable arm D with one end connected to said lug by a bolt or other suitable fastening, and the opposite end of the arm connecting in like manner with a flanged bracket E, and to this bracket also connects the drag-bar F.

A simple means is provided for rotatably connecting the disk A to the bracket E, whereby said disk is free to rotate and also adjustably connecting the scraper C with the bracket. The means employed resides in providing the disk A with a suitable hub G, having a circumferential socket d for the circumferential flange e to engage, which flange projects from the inner side of the scraper C at the upper end thereof, as shown in Fig. 8 of the drawings, said flange having a suitable opening f to serve as an outlet for the dust and dirt.

A spindle or short bearing-axle I projects from the bracket E, upon which is placed the sleeve H, and is located within the hub G, the spindle being tapering upon its exterior and the sleeve preferably tapering upon its interior and exterior, as shown in Fig. 4 of the drawings. The spindle I is slightly longer than the length of the sleeve H, so that its end will project beyond the plane of the sleeve and form a support for the flanged end of the scraper C. The projecting end of the spindle I engages a correspondingly-formed socketed seat g in the flanged end of the scraper C, as shown in Fig. 8 of the drawings, and by having the length of the spindle of greater length than the sleeve H the flanged end of the scraper and the hub G are prevented from frictional contact with each other. The flanged end of the scraper forms a dust-cap for the bearing at the center of the disk in addition to performing its usual function in holding the furrow open to receive the grain, this dust-cap being important in protecting the bearing. The flanged end of the scraper C has a straight-sided opening h to correspond with the straight or flat-sided portion i of the fastening-bolt J, the opening in the flanged end of the scraper being somewhat larger than the flat-sided portion of the bolt to admit of the scraper being turned to the right or left to change the position of the point of the scraper with relation to the edge of the disk A. After the screw-nut j upon the screw-threaded end of the bolt J has been loosened and the position of the scraper C adjusted the nut is screwed up tight on the bolt, which will draw the flanged end of the scraper tightly against the end of the spindle I and hold the scraper in its adjusted position.

The bracket E has a socketed seat k, which is provided with an outlet l for the dust and dirt, said seat receiving the ends of the hub G and sleeve H, as shown in Fig. 4 of the drawings.

The hub G is suitably secured to the disk A and the spindle I has flat sides, and the sleeve a flat-sided opening to correspond therewith, so that when the sleeve is placed upon the spindle it will be prevented from turning thereon, as shown in Figs. 5 and 7.

A very simple means is provided for adjustably connecting the scraper to the bracket and forming a bearing for the rotatable disk with comparatively little friction, the scraper effectively cleaning the disk and breaking the land side of the furrow and adjusting the scraper to suit the condition of the ground. It is preferred that the spindle, the sleeve, and the hub have a slight taper, as shown in Fig. 4 of the drawings; but I do not wish to limit my invention thereto, and, if desired, the bracket may have a suitable wick-cup for the lubricant, as shown at m in Figs. 3 and 5 of the drawings, and the concave side of the disk may have a scraper n of the usual construction connected to the bracket for cleaning it.

It is evident that many changes or modifications in the several details of construction may be resorted to without in any manner departing from the essential features of the invention.

Having now fully described my invention, what I claim as new, and desire to secure by Letters Patent, is—

1. In a disk-drill attachment, a disk furrow-opener, a conduit-tube, a suitable structure with which said tube is connected, a scraper connecting with the axis of the disk furrow-opener and provided at its end with a flanged dust-cap and a structure with which said cap is connected and means whereby said scraper may be adjusted and held in its adjusted position, the tube and scraper being unconnected to present a free and unobstructed space between the two for the passage of the dirt and trash, substantially as and for the purpose specified.

2. In a disk-drill attachment, a disk furrow-opener and a hub thereon having a circumferential socket, a scraper having a flanged dust-cap, the flange thereof engaging the circumferential socket, and means for adjustably holding the flanged dust-cap in engagement therewith, substantially as and for the purpose described.

3. In a disk-drill attachment, a disk furrow-opener, a hub thereon having a circumferential socket, a scraper having a flanged dust-cap, a suitable structure having a bearing-spindle, a sleeve held stationary upon the spindle, and means for adjustably holding the flanged dust-cap in engagement with the socket, substantially as and for the purpose set forth.

4. In a disk-drill attachment, a conduit-tube and a suitable structure with which said tube is connected, a scraper unconnected with the tube, a disk furrow-opener having a hub with circumferential socket, a flanged dust-cap upon the end of the scraper, and means for adjustably holding the cap in engagement with the socket, substantially as and for the purpose specified.

5. In a disk-drill attachment, a disk furrow-opener, a hub thereon with circumferential socket, a structure for supporting the disk furrow-opener having a bearing-spindle, a sleeve upon the spindle, a scraper having a flanged dust-cap adapted to engage with the socket, said spindle of a length to project beyond the plane of the sleeve and engaging a socket in the cap, and means for adjustably holding the flanged dust-cap in engagement with the socket in the hub, substantially as and for the purpose described.

In testimony whereof I affix my signature in presence of two witnesses.

JOHN WILKINSON SMITH.

Witnesses:
ANDREW GRAHAM,
JAMES C. IRWIN.